E. A. FRANKLIN.
SILO CHUTE.
APPLICATION FILED MAY 20, 1916.
1,217,743.
Patented Feb. 27, 1917.
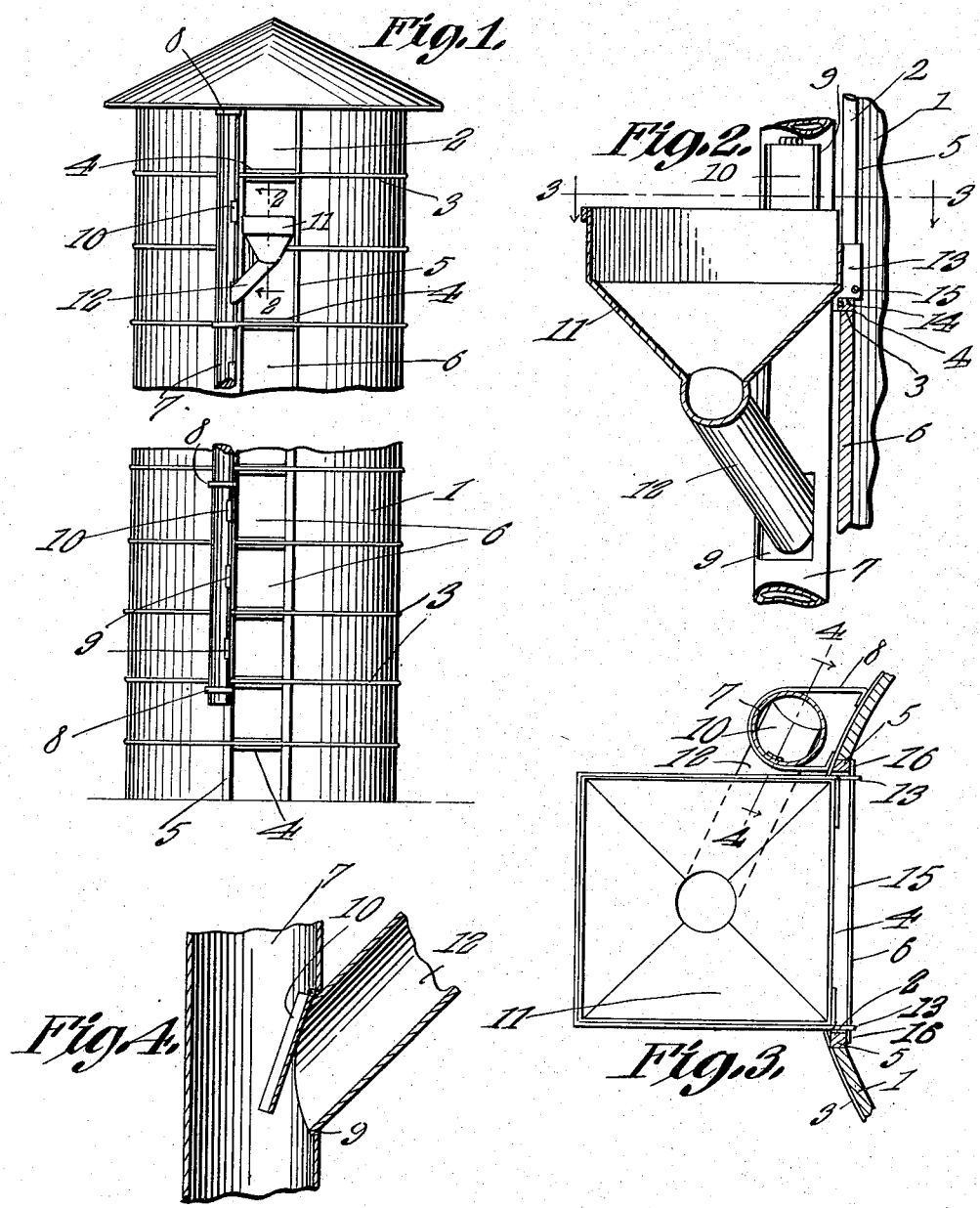
Witnesses
E. A. Franklin,
Inventor
by C. A. Snow & Co.,
Attorneys

UNITED STATES PATENT OFFICE.

EDWARD A. FRANKLIN, OF AUSTIN, TEXAS.

SILO-CHUTE.

1,217,743.

Specification of Letters Patent.

Patented Feb. 27, 1917.

Application filed May 20, 1916. Serial No. 98,847.

*To all whom it may concern:*

Be it known that I, EDWARD A. FRANKLIN, a citizen of the United States, residing at Austin, in the county of Travis and State of Texas, have invented a new and useful Silo-Chute, of which the following is a specification.

The present invention appertains generally to silos, and relates more particularly to a discharge chute therefor.

This invention contemplates the provision of a novel and improved contrivance whereby the ensilage may be conveniently discharged from the interior of the silo, the present methods which are now in vogue, being unsatisfactory in several respects. It is the practice at the present day, to apply a chute to the silo over the door openings, which not only requires that the operator ascend and descend the silo through the chute, but which also cuts off the admission of air and light into the silo to a large extent.

As a more specific object, the invention comprehends the provision of a chute permanently carried by the silo at one side of the door openings, in combination with a hopper adjustably supported by the silo and coöperable with the chute, whereby the ensilage may be readily pitched into the hopper to be directed into and down the chute to the ground.

Another object of the invention is to provide novel means for supporting or mounting the hopper adjacent the door openings, and for proper coöperation with the chute.

It is also within the scope of the invention, to provide an appliance of the nature indicated, which will be comparatively simple and inexpensive in construction, which may be readily applied to existing silos, and which will be convenient, efficient and thoroughly practical in use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in its preferred embodiment in the accompanying drawing, wherein:—

Figure 1 is an elevation of a silo having the present invention applied thereto, parts being broken away.

Fig. 2 is an enlarged sectional view taken on the line 2—2 of Fig. 1.

Fig. 3 is a sectional view taken on the line 3—3 of Fig. 2.

Fig. 4 is an enlarged sectional view taken on the line 4—4 of Fig. 3.

In the drawing, there is delineated an ordinary or conventional silo 1 having the vertical series of door openings 2, and hoops 3 embracing the silo between the door openings 2. Door sills 4 are secured between the jambs 5 of the series of door openings, the sills 4 being disposed adjacent or under the hoops 3, and separating the door openings. The superposed doors 6 are applicable to the silo as usual for closing the door openings 2 when the silo is filled with the ensilage.

In carrying out the present invention, there is provided a suitable vertical chute 7 disposed at one side of the door openings 2 of the silo, and permanently or fixedly carried by the silo by means of suitable brackets 8. The lower end of the chute 7 terminates above the ground, in order to properly deliver the ensilage discharged down the chute onto the ground, or a wagon, wheel-barrow, or other receptacle.

The chute 7 is provided at that side adjacent the openings 2, with a series of side inlet openings 9 arranged adjacent the respective door openings 2 of the silo, and flap valves or doors 10 are hinged to the chute 7 at the upper ends of the respective openings 9 to normally swing downwardly and close the said openings.

In connection with the chute 7, there is employed a suitable hopper 11, having a depending spout 12 extending angularly or obliquely to one side. This hopper 11 is normally disposed within the silo upon ensilage, and is of a size that it may be passed readily through the openings 2 of the silo.

In order to properly support or mount the hopper when it is inserted to operative position through one of the door openings 2, a pair of plates 13 are secured to the sides of the hopper and project beyond the back thereof, the plates 13 being provided with lower notches or recesses 14 engageable over the sills 4 of the door openings 2. A cross rod 15 is engaged through the plates 13 above the notches 14, and has its ends projecting to provide stops 16 projecting from the plates 13 and adapted to contact with the inner sides of the jambs 5 of the door openings.

When the silo is filled with the ensilage, it being understood that the doors 6 are closed, the hopper 11 is disposed upon the ensilage so as to be stored within the silo for ready use whenever desired. When it is desired to discharge the ensilage, the doors 6 above the level of the ensilage are opened, and the hopper 11 is inserted outwardly, with its spout foremost, through that opening 2 at the level of the ensilage, the notches 14 of the plates 13 being engaged over the sill 4 of the said door opening 2, and the hopper 11 then being swung upon the sill 4 to operative position, as seen in Fig. 1, which will cause the spout 12 to automatically swing through the proper inlet opening 9 of the chute 7, and to thereby swing the respective valve or door 10 open. The stops 16 of the hopper in contacting with the inner sides of the jambs 5 will hold the hopper against excessive outward movement, so that the hopper will be properly and firmly held in place with the spout 12 thereof projecting into the chute 7. The ensilage may then be shoveled or pitched into the hopper 11, from which it will be discharged through the spout 12 into the chute 7, and down the chute to the ground. Then, after the ensilage has been sufficiently removed to enable the next succeeding door 6 to be opened, this is done, and the hopper 11 is swung back into the silo, and then inserted through the next succeeding lower door opening 2 in the same manner as above described. Thus, as the ensilage is removed from the silo, the hopper may be adjusted downwardly accordingly, without great trouble.

Attention is directed to the fact that with the present contrivance, the chute is disposed at one side of the door openings 2 of the silo, which will not in any manner interfere with the admission of light and air into the silo through the door openings 2 when the doors are opened, and furthermore the operator may readily ascend and descend the silo along the usual ladder provided on the doors 6.

The present device is most satisfactory and convenient in practice, and is capable of inexpensive manufacture and application. The other advantages and features of the present structure will be obvious to those familiar in the art, without further comment being deemed necessary.

Having thus described the invention, what is claimed as new is:—

1. The combination with a silo having a vertical series of openings, of a chute carried by the silo adjacent to said openings and having a series of side inlets, and means adjustable vertically to the various silo openings for catching ensilage and for directing it through one of said inlets into the chute.

2. The combination with a silo having a vertical series of openings, of a chute carried by the silo adjacent to said openings and having a series of side inlets, and a vertically adjustable hopper adapted to be carried by the silo adjacent the said openings and having a spout insertible through the said inlets of the chute.

3. The combination with a silo having a vertical series of openings, of a chute carried by the silo at one side of the said openings, the chute having inlet openings in that side adjacent the said openings of the silo, flap valves hinged to the chute to normally close the inlet openings thereof, and a hopper arranged to be carried by the silo adjacent the openings thereof and having an obliquely projecting spout insertible through the said inlet openings of the chute.

4. The combination with a silo having a vertical series of openings, of a chute carried by the silo adjacent to said openings and having side inlets, and a hopper insertible from within the silo outwardly through the said openings, the hopper having a spout insertible through one inlet of the chute when the hopper is inserted outwardly through one of the openings of the silo, and having means for supporting it in place when inserted outwardly through one of the said openings.

5. The combination with a silo having a vertical series of openings, of a chute carried by the silo adjacent to said openings, and a hopper insertible outwardly through the said openings from within the silo and having a spout coöperable with the chute when the hopper is inserted outwardly through one of the said openings, the hopper having means engageable upon the sill of the opening through which it is inserted, and having stops engageable with the interior of the silo for holding the hopper against excessive outward movement.

6. The combination with a silo having a vertical series of openings, of a chute carried by the silo at one side of the said openings, a hopper insertible outwardly through the said openings from within the silo and having a spout coöperable with the said chute when the hopper is inserted outwardly through one of the said openings, plates attached to the hopper and having notches engageable over the sill of the opening through which the hopper is inserted, and a cross rod engaged through the said plates and projecting therefrom to provide stops engageable with the interior of the silo for limiting the outward movement of the hopper.

7. The combination with a silo having a vertical series of openings, of a chute carried by the silo adjacent to said openings and having side inlets at various vertical points thereof, flap valves hinged to the chute for normally closing said openings and swingable inwardly, and means adjustable vertically to the various openings of the silo for catching the ensilage and having a spout insertible through said inlets for directing the ensilage into the chute.

In testimony that I claim the foregoing as my own, I have hereto affixed my signature in the presence of two witnesses.

EDWARD A. FRANKLIN.

Witnesses:
ARTHUR HOHES,
T. A. LOW.

Copies of this patent may be obtained for five cents each, by addressing the "Commissioner of Patents, Washington, D. C."